United States Patent [19]
Sutherland et al.

[11] Patent Number: 5,943,491
[45] Date of Patent: Aug. 24, 1999

[54] CONTROL CIRCUIT OF MUTUAL EXCLUSION ELEMENTS

[75] Inventors: Ivan E. Sutherland, Santa Monica, Calif.; Robert F. Sproull, Newton, Mass.; William S. Coates, Redwood City, Calif.

[73] Assignee: Sun Microsystems, Inc., Palo Alto, Calif.

[21] Appl. No.: 08/954,251

[22] Filed: Oct. 20, 1997

[51] Int. Cl.[6] .................................................. G06F 9/38
[52] U.S. Cl. ..................... 395/553; 395/800.41
[58] Field of Search .............. 395/750.05, 559, 395/553, 800.18, 800.41

[56] References Cited

U.S. PATENT DOCUMENTS

| | | | |
|---|---|---|---|
| 3,746,886 | 7/1973 | Konopka | 377/122 |
| 3,757,308 | 9/1973 | Fosdick | 364/786.01 |
| 3,810,119 | 5/1974 | Zieve | 395/553 |
| 4,521,772 | 6/1985 | Lyon | 340/710 |
| 5,060,145 | 10/1991 | Scheuneman | 711/148 |
| 5,187,800 | 2/1993 | Sutherland | 395/800 |
| 5,841,298 | 11/1998 | Huang | 326/97 |

OTHER PUBLICATIONS

Carver Mead and Lynn Conway, *Introduction to VLSI Systems*, Addison–Wesley Publishing Co., Reading, Mass. (1980), pp. 260–261.

Sproull, Robert F., et al., "Counterflow Pipeline Processor Architecture," Sun Microsystems Laboratories, Inc., as published by the Institute of Electrical and Electronics Engineers, reprinted from *IEEE Design& Test of Computers* (Fall, 1994), vol. 11, No. 3.

*Primary Examiner*—Eric Coleman
*Attorney, Agent, or Firm*—Townsend and Townsend and Crew LLP

[57] ABSTRACT

In certain systems where a series of stages are employed, it is desirable to control the action of a stage without possibility of interference form adjacent stages. A circuit of linked mutual exclusion elements is described which renders inactive the stages adjacent to an active stage, or inhibits action in a stage if any of its neighbors is active. This ensures that the stages adjacent to an active stage remain inactive, thereby avoiding problems associated with input events changing while an adjacent stage is active.

20 Claims, 7 Drawing Sheets

CONTROL CIRCUIT OF MUTUAL EXCLUSION ELEMENTS

BACKGROUND OF THE INVENTION

This invention relates to control circuits using a linear mutual exclusion chain, and in particular to a circuit for controlling pipeline stages in asynchronous systems. The chain provides asynchronous 'turns' to a group of counterflow pipeline stages. The chain of mutual exclusion elements enables action in any stage to exclude action in the two neighboring stages. In some cases stages receive two turns in succession, inhibiting their neighbors for the longer interval required for the two actions. The control circuit described allows such an asynchronous system to operate at very high speeds, for example, on the order of about 700 Mhz or more.

Counterflow pipeline processors are well known. Counterflow pipeline processors are computer system processors in which instructions and results flow in opposite directions within a pipeline and interact as they pass. In counterflow pipeline processors, a pipeline is formed from stages, each of which includes an instruction portion and a results portion. Instructions flow in one direction through the pipeline, while results flow in the other direction. In such systems the operation of the various stages with respect to each other must be controlled to assure that instructions and results are transferred at appropriate times when the destination is able to receive them and act upon them.

A more detailed discussion of prior work on counterflow pipeline processors is described in a publication "Counterflow Pipeline Processor Architecture" available from Sun Microsystems, assignee of this invention, as report SMLI TR-94-25. It is also the subject of commonly-assigned U.S. Pat. No. 5,187,800, entitled "Asynchronous Pipelined Data Processing System." In such systems it is important to assure that the instructions and the results interact properly within each stage and that each stage is not provided with more data during the interaction process. Therefore a suitable control system to allow the stages to communicate properly is necessary. The circuit of this invention provides such a mechanism.

Also known are circuits to provide mutual exclusion between two contenders. Such circuits are described, for example, in Chapter 7 entitled "System Timing," Section 7.8.6 (pp. 260–261) of *Introduction to VLSI Systems*, by Mead and Conway (Addison Wesley, 1980), and elsewhere. As depicted therein, one basis for such circuits is a flip flop and a threshold detector. Each of the two contenders for service attempts to place the flip flop in the state favoring its service. The problem, of course, is that the two contenders might both request service at the same time, leaving the flip flop in a "metastable" state where it is neither flipped nor flopped. The threshold detector is designed so that it will announce success in the choice only when the flip flop has left the metastable region and is firmly flipped or flopped.

SUMMARY OF THE INVENTION

Controlling the action of a stage in a counterflow pipeline is simplified if the two stages adjacent to the active stage are idle and cannot change state during the period when the intermediate stage is active. One way to enforce this behavior is to couple all of the odd stages together and all of the even stages together and to alternately activate all the odd stages and all the even stages. The drawback of this scheme is that it imparts an undesirable rigidity to the pipeline.

The mutual exclusion chain circuit described herein also renders inactive the stages adjacent to an active stage, but it does so in a less rigid way. Instead of tying odd and even stages together, the circuit of our invention uses mutual exclusion elements linked between stages. These linked mutual exclusion elements render inactive the neighbors of any active stage, or they inhibit action in a stage if any of its neighbors is active.

In one embodiment a system according to our invention includes a control circuit having a sequence of stages coupled to each other. Each stage includes circuitry for determining if an adjacent stage is active, and if so prevents activity in the stage so determining. The system also includes an execution circuit for performing a desired activity in each unit of a sequence of units, and a series of interconnections between the control circuit and the execution circuit whereby each unit is inhibited from performing the desired activity when an adjacent unit is active.

In one embodiment a circuit according to our invention provides a mechanism for assuring that activity in a given stage in a series of stages precludes activity in adjacent stages. The circuit includes a sequence of stages coupled between an upper potential source and a lower potential source. Each stage includes an output node, first and second input nodes, a first transistor having a gate electrode coupled to the first input node; a drain electrode coupled to the output node, and a source electrode coupled to the lower potential, a second transistor having a gate electrode coupled to the second input node, a drain electrode coupled to the output node, and a source electrode also coupled to the lower potential. Each stage also includes a third transistor having a drain electrode coupled to the output node, a source electrode coupled to the lower potential, and a gate electrode coupled to receive a Done signal. Each stage further includes a fourth transistor having a gate electrode coupled to receive a request signal, a drain electrode coupled to the output node, and a source electrode connected to the upper potential. The first input node of each stage is coupled to the output node of the immediately preceding stage, and the second input node of each stage is coupled to the output node of each immediately subsequent stage. When a stage adjacent to the selected stage is active, its output node is high. The high potential is applied to the gate electrode of either the first or the second transistor of the selected stage, which pulls the output node low precluding activity at the selected stage. Alternatively, when the selected stage is active, its output node goes high. This high potential is applied to the gate of the second transistor in the preceding stage and the first transistor in the following stage, thereby preventing activity at the preceding and following stages. In this manner each stage is precluded from operation whenever an adjacent stage is operating.

DESCRIPTION OF THE SPECIFIC EMBODIMENTS

Figure 1:
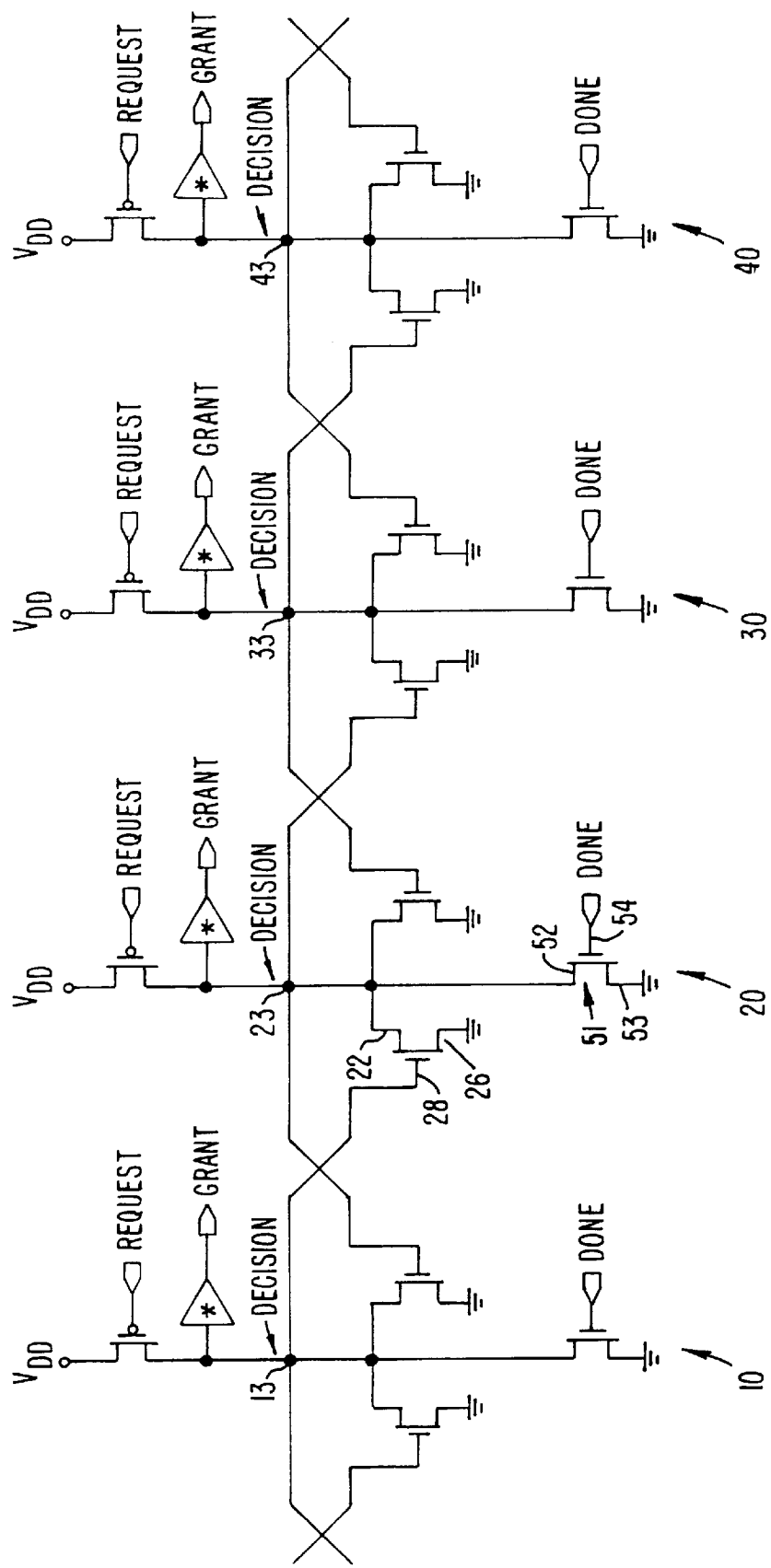
FIG. 1 is a circuit schematic of a chain of mutual exclusion elements.

FIG. 1 is a diagram illustrating a chain of stages 10, 20, 30, 40 coupled by mutual exclusion elements according to one embodiment of this invention. Each mutual exclusion element spans two stages, as shown by the crossed connections in FIG. 1. Each stage in the chain of mutual exclusion elements includes four transistors. Below the operation of stage 20 is described, and it will be appreciated that the operation of each of the other stages 10, 30, and 40 is the same. Stage 20 includes first and second parallel-connected NMOS transistors 21 and 24. The commonly-connected drains 22 and 25 are connected to node 23. The commonly-connected sources 26 and 27 are connected to a low potential, for example, ground. The gate 28 of transistor 21 is connected to a node 13 in the preceding stage 10, while the gate 29 of transistor 24 is connected to a corresponding node 33 in subsequent stage 30. Node 23 is also switchably connected through transistor 51 to the same low potential. Transistor 51 has its drain 52 connected to node 23, its source 52 connected to ground, and its gate 54 connected to receive a Done signal. Stage 20 also includes a further PMOS transistor 60 which has a drain 61 connected to the high potential $V_{DD}$, a drain 62 connected to node 23, and a gate connected to receive the Request signal.

Each stage in the chain receives signals from external circuits which are discussed further below. In general, each stage receives a Request signal and a Done signal, and provides a Grant signal. The Request, Grant, and Done signals are coupled to the counterflow pipeline stages as described in conjunction with FIG. 2 below.

Each stage 10, 20, 30, 40 consists of three wide NMOS transistors, for example, transistors 21, 24, and 51 and one narrow PMOS transistor, for example, transistor 60 connected to a common "Decision" node 23 as shown. Two of the NMOS transistors 21 and 24 are driven by the Decision nodes of adjacent stages. If the voltage on the Decision node of a stage exceeds a certain threshold level, the gate 90 drives that Grant node HI, giving that stage a "turn." A stage having a turn inhibits its two neighbors from having a turn by making one of the neighbors NMOS transistors conduct, reducing the voltage on the neighbor's Decision node below the threshold level. The third NMOS transistor, with input terminal "done," resets the output node 23 LO after a turn is complete. In some biological systems the phenomenon by which action in one location inhibits action in neighboring locations is known as "lateral inhibition." The circuit described provides this capability.

The narrow PMOS transistor 60 delivers current into the Decision node 23 of each stage, tending to drive the grant node HI. The gates of the small P-type transistors are marked "Request." This is a LO active signal. Because the P-type transistor 60 is narrow, it delivers too little current to overcome the drive of either one of the NMOS transistors 21 and 24, if the neighbor's grant node 13 or 33 is above the threshold value inhibiting the action of this stage. Thus, even if the PMOS transistor 60 conducts, neighboring stages having turns will exclude this stage 20 from having a turn. If the stage does not need a turn, the circuitry connected to it turns off P-type transistor 60.

Figure 2:
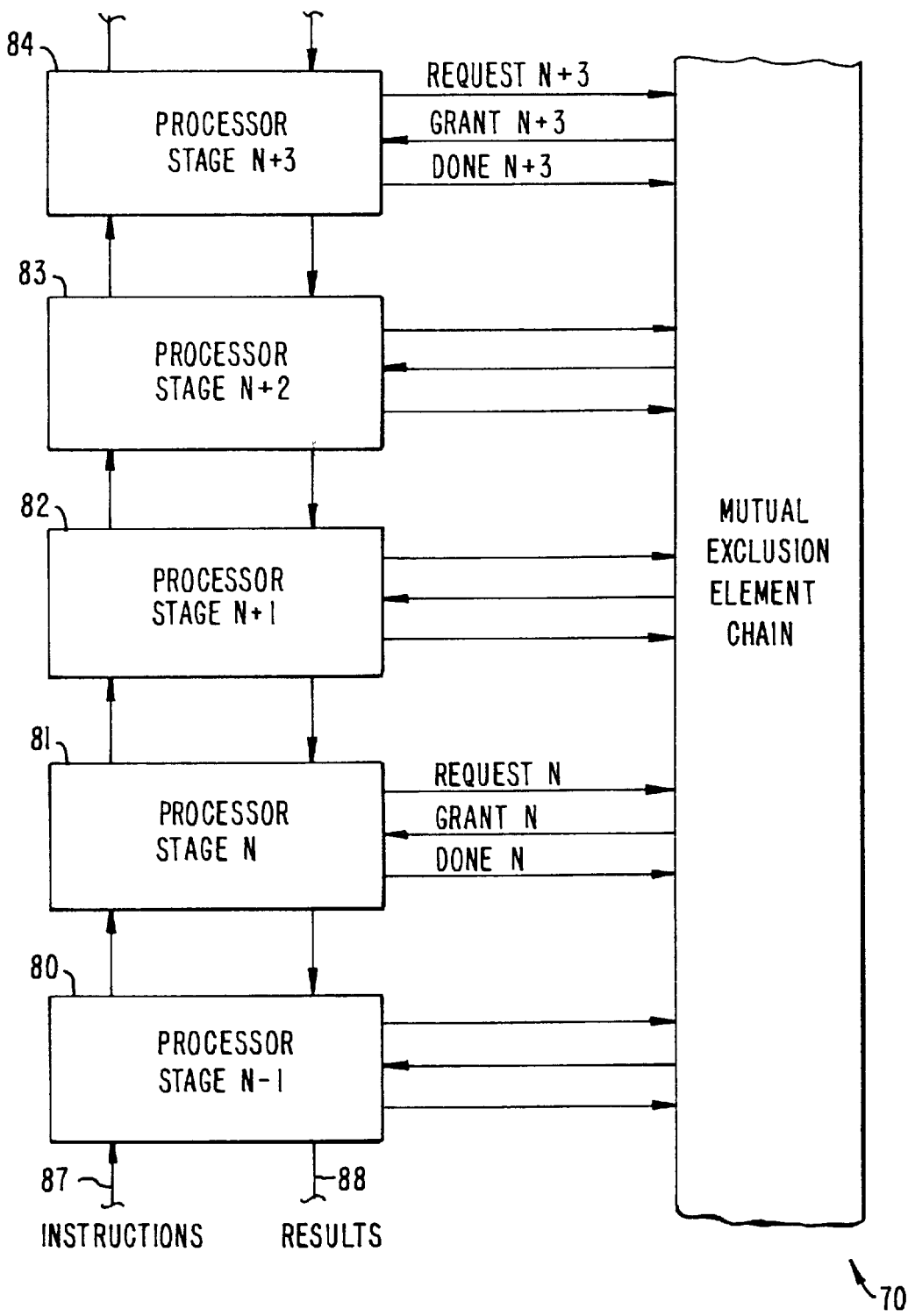
FIG. 2 is a diagram illustrating the coupling of a chain of mutual exclusion elements such as depicted in FIG. 1 to stages in a counterflow pipeline processor.

FIG. 2 illustrates the interconnection of a chain of mutual exclusion elements 70 with the stages 80, . . . , 84 of a counterflow pipeline processor. Only exemplary stages are shown; it should be appreciated that more or fewer stages may be employed as necessary depending upon the particular processor design.

In the processor, instructions generally enter via path 87 and progress upward through the stages 80, 81, 82, etc. Each instruction will execute at some stage in the pipeline, but typically different types of instructions execute in different stages. The results of the execution flow in a downward path 88 through each stage. The results carry names and values which allow them to be combined with the appropriate instructions to produce further results. The details of this operation are known and described further in the documents referred to above.

Coupled to the chain of processor stages is the mutual exclusion element chain 70. Chain 70 consists of a series of devices, for example as shown in FIG. 1. The mutual exclusion chain 70 communicates with the processors 80, etc., using Request signals, Grant signals, and Done signals. As data items move through the chain of processors, requests are made for transfer of information to subsequent processors as indicated by signals on the Request lines. Once a Request is presented to that portion of the chain, the Grant signal is supplied in response. After producing the Grant signal in response to a Request signal, that portion of the chain produces no further Grant signals until it receives the Done signal D from that processor stage. In response to that indication, as described in conjunction with FIG. 1, that stage is then free to make the next request to pass information to the next stage in the processor chain.

One might achieve the results desired here by using a separate mutual exclusion element between each pair of stages in the pipeline, as opposed to the illustrated embodiment. In such a case, a stage would be active only when it successfully wins service from each of the mutual exclusion elements adjacent to it. Such a circuit, however, could suffer deadlock should each stage obtain service from the mutual exclusion element below it, but not from the one above. An important feature of the circuit described here is its use of direct coupling between adjacent mutual exclusion elements to avoid deadlock. The circuit resolves contention between a stage and its adjacent stages by operating as an analog circuit, rather than by separate decisions with outcomes combined digitally by a logical AND.

Figure 3A:
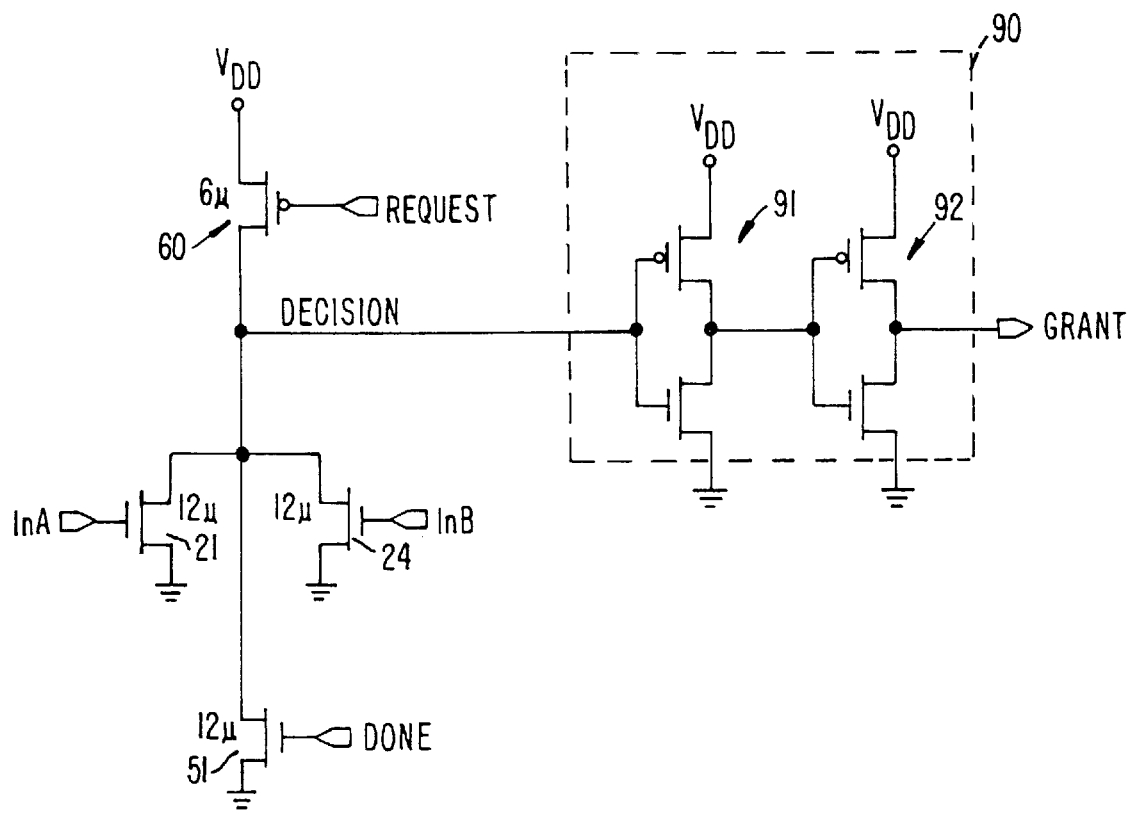
FIG. 3a is a schematic of one portion of the circuit as simulated.
Figure 3B:
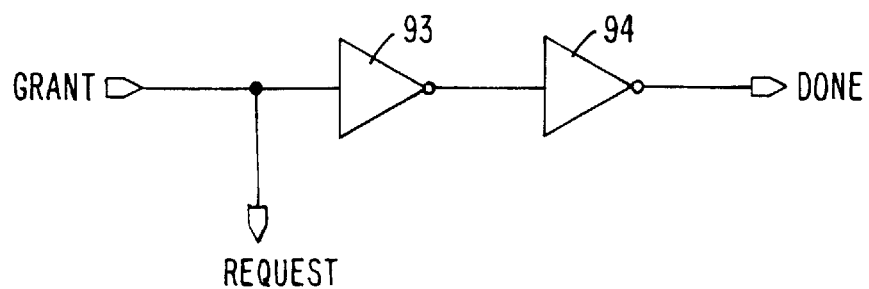
FIG. 3b is a schematic of another portion of the circuit as simulated.

To demonstrate the performance advantages of the circuit shown in FIG. 1 simulations were performed. For simulation the circuit was divided into two parts. The first part, called "mutual exclusion subcircuit," appears in FIG. 3a. In addition to the three N-type transistors 21, 24, 51, each $12\mu$ wide, this circuit includes a threshold detecting inverter 91 and a buffer 92 to drive the signal called "Grant." The transistor sizes in inverter 90 are chosen to establish a threshold higher than the metastability voltage of the mutual exclusion chain. The threshold detecting inverter 91 avoids giving a Grant until the voltage on the output node 23 of this stage exceeds the metastability threshold. The final output of the simulation circuit is the digital signal called "Grant." When Grant goes HI, it indicates that this stage has succeeded in winning a turn from both of its neighbors. The two input terminals "inA" and "inB" couple the circuit to its neighbors. The input terminal called "done" drives the reset transistor 51. FIG. 3b illustrates the portion of the circuit called "processor subcircuit." It contains a pair of inverters 94, 95 to simulate the actions of the user from the time of granting a turn until the user declares done. The circuits of FIGS. 3a and 3b are coupled as indicated by the labeled terminals in each figure. For the simulation a chain of five stages was used, with dummy "mutual exclusion subcircuits" at each end to make the loading on the last active stages the same as for center stages.

Figure 3C:
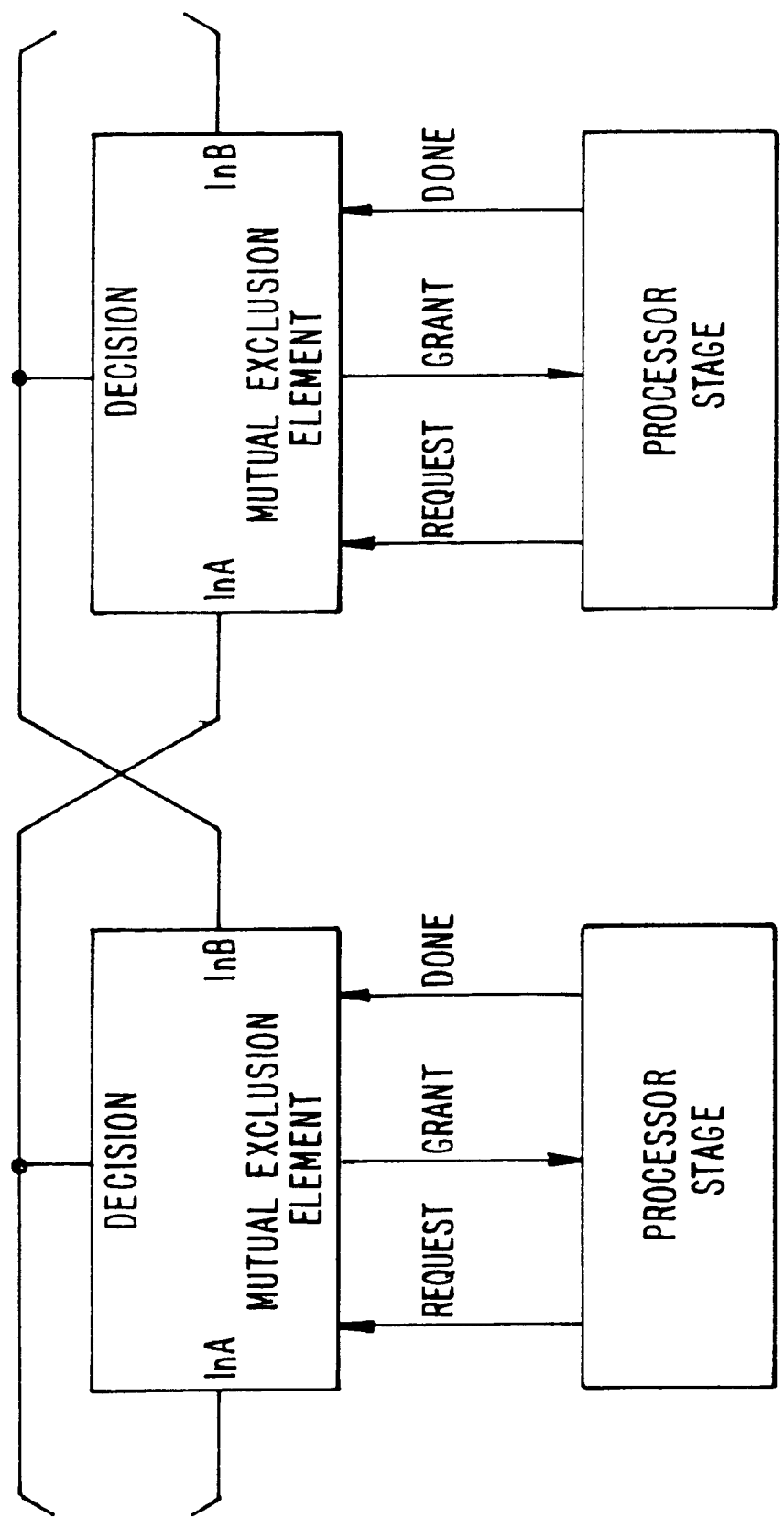
FIG. 3c illustrates the coupling of stages in a simulation.

The interconnections between the circuits shown in FIG. 3a and FIG. 3b is illustrated in further detail in FIG. 3c. As shown there, the circuit of FIG. 3a provides the chain of exclusion elements, while the circuit of FIG. 3b provides the connections to the nodes of the mutual exclusion circuit shown in FIG. 1.

Figure 3D:
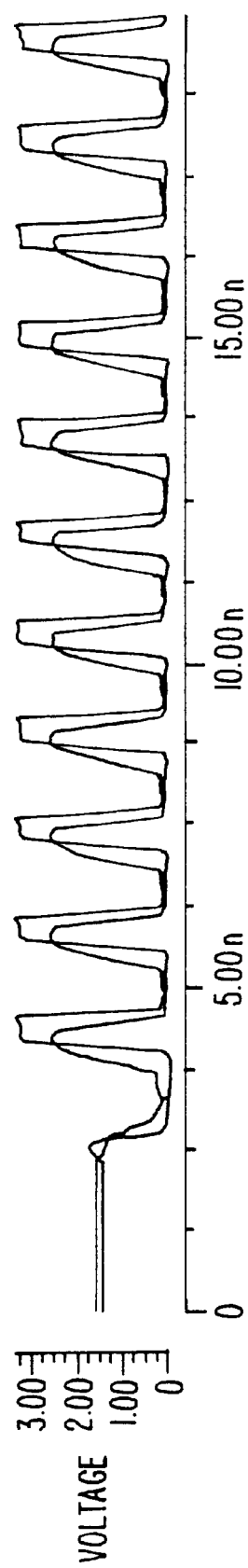
FIG. 3d illustrates the results of the simulation.

Typical results of the simulation are shown in FIG. 3d, which displays two traces. The taller trace is the signal called "Grant." The shorter trace, saw tooth shaped, is the signal labeled "Decision." It rises more slowly than the taller trace because it is driven only by the narrow pull up transistor 60. This simulation shows strict alternation of stage activity. Cycles in this simulation take about 1.5 nsec for a frequency in excess of 600 MHz.

Figure 4:
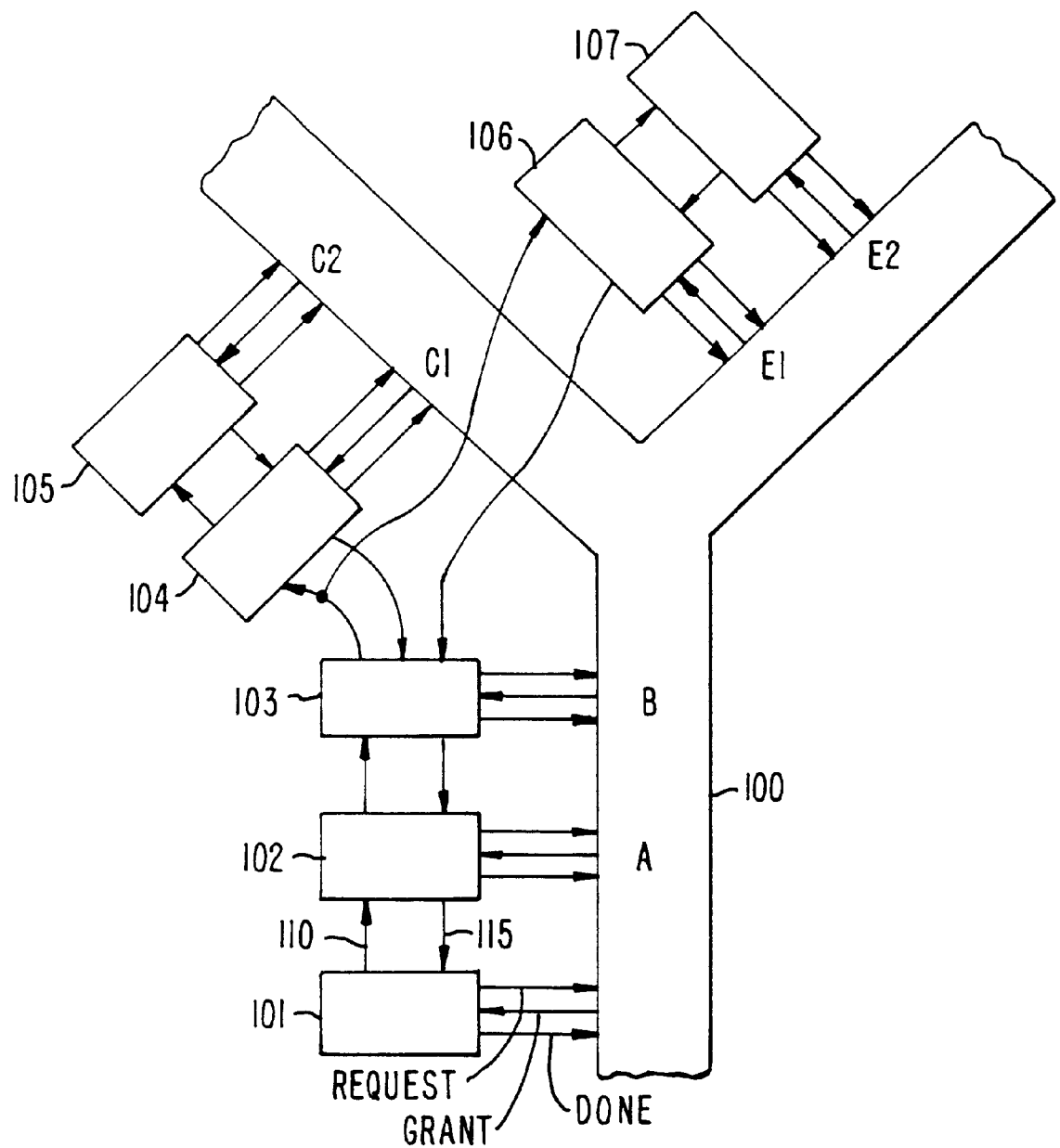
FIG. 4 illustrates another embodiment of a control circuit.

FIG. 4 is a schematic drawing illustrating a Y configuration for the mutual exclusion element control circuit. Such a configuration is applicable to situations in which, for example, the processor being controlled includes branching pipelines. In a manner analogous to that depicted in FIG. 2, the processor stages 101, 102, . . . , 107 are shown schematically. The stages are coupled together in series with instructions flowing up one path 110 and results flowing down the other path 115. Above a stage 103 the pipeline branches so that instructions from stage 103 are passed to both stages 104 and 106, while results arrive at stage 103 from both stages 104 and 106. Logic (not shown) within stage 103 may choose which or both result paths from stages 104 and 106 is to be active.

Controlling the pipeline is a chain of mutual exclusion elements 100 which is similar to chain 70 shown in FIG. 2, and can be implemented using the circuitry shown in FIG. 1. The mutual exclusion element chain 100 operates just as the chain described in conjunction with FIGS. 1 and 2 operates. Each of the processor stages (for example, stage 103) communicates with the mutual exclusion element chain 100 using Request, Grant, and Done signals as depicted for stage 103.

Figure 5:
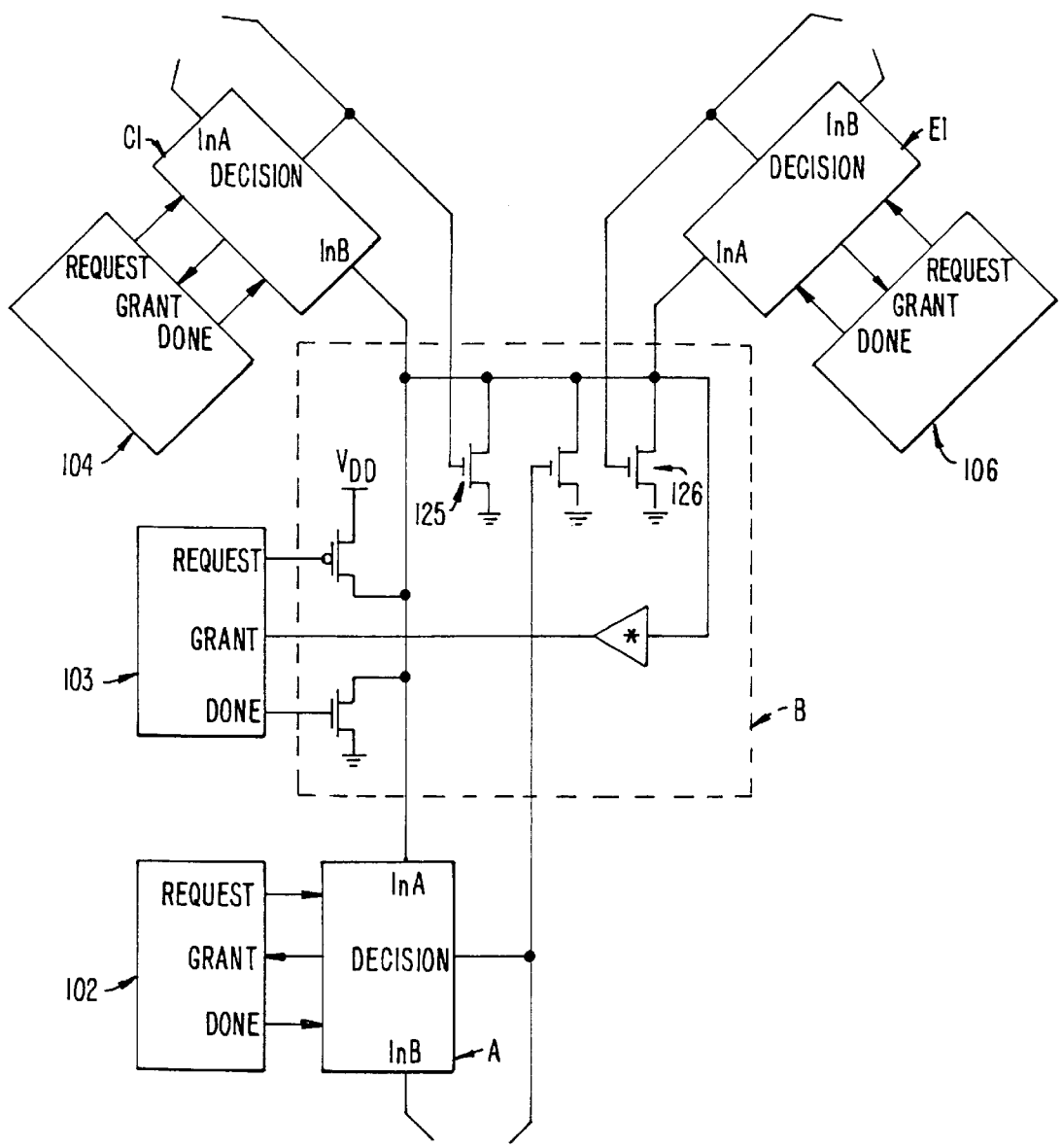
FIG. 5 is a detailed schematic of the embodiment of FIG. 4.

FIG. 5 is a detailed circuit schematic of the circuitry for implementing the branching chain of mutual exclusion elements shown schematically as Y 100 in FIG. 4. Shown in FIG. 5 are four stages in the chain designed A, B, C1, and E1. Stage A receives signals from and supplies them to a previous stage at the bottom portion of FIG. 5, while stages C1 and E1 receive signals from and supply signals to stages C2 and E2 at the top of FIG. 5. These stages are labeled to correspond to the labeling in FIG. 4.

The circuitry depicted in FIG. 5 corresponds to that described in conjunction with FIG. 1.

The primary difference between the circuit shown in FIG. 5 and that shown in FIG. 1 is the presence of the stage designated B. Stage B has transistors 125 and 126. Transistor 125 is connected to receive the signal from stage C1, while transistor 126 receives the signal from stage E1. In the same manner as described for the circuit of FIG. 1, action in either of stages C1 or E1 precludes action by stage B. This is achieved by the extra transistor 125 or 126 not present in other stages.

Although we have described a one-dimensional chain of mutual exclusion elements (FIG. 1) and a branching chain of mutual exclusion elements (FIG. 5), the concept can easily be extended to two, or more, dimensions. For example, imagine black and white squares on a checkerboard with mutual exclusion circuits between them such that activity in any black square inhibits activity in the four adjacent white squares and activity in any white square inhibits activity in the four adjacent black squares. A similar arrangement in three dimensions is also possible; each element inhibits its six neighbors. The mutual exclusion circuits might have other kinds of symmetry. For example, for hexagonal symmetry in two dimensions, each element inhibits six adjacent neighbors. For hexagonal symmetry in three dimensions, like cannon balls in a pile, each element inhibits 12 adjacent neighbors.

The circuit is also useful in configurations that lack symmetry. For example, if a module of a computer system requires that N other specified modules must be inactive in order for the given module to operate, it can be controlled by a mutual exclusion circuit with N inputs connected to nodes that indicate activity of each of the other N modules. Within the mutual exclusion circuit, each of the N inputs may be connected to a transistor similar to 126 in FIG. 5, so as to inhibit activity of the given module if any of the other N modules is active. The other modules must have reciprocal connections to enforce their inactivity when the given module is active.

The circuit described here has application to many different uses. One use illustrated in FIG. 2 is to control a counterflow pipeline. In another use, the circuit can also control relaxation computations in any number of dimensions. In a relaxation computation one reduces the total "energy" of a system by changing local parameters in such a way as to reduce "energy" locally. It is well known that in relaxation computations one must hold the neighbors of an active element stable while changing the active element's values. If two adjacent elements are changed concurrently, their combined energy might increase, defeating the purpose of the computation. The present invention offers a technique to ensure the required stability of neighbors in an asynchronous manner.

The foregoing has been a description of embodiments of the invention. It will be appreciated that numerous departures from the specific circuitry shown may be made without departing from the spirit of the invention, which is further defined in the appended claims and their equivalents.

What is claimed is:

1. A system comprising:
   a control circuit having a sequence of stages coupled to each other, each stage including circuitry for determining if an adjacent stage is active and in response preventing activity in the stage so determining;
   an execution circuit for performing a desired activity in each unit of a sequence of units; and
   a series of interconnections between the control circuit and the execution circuit whereby each unit is inhibited from performing the desired activity when an adjacent unit is active.

2. A system as in claim 1 wherein the execution circuit operates asynchronously.

3. The system of claim 1 wherein each stage in the control circuit comprises:
   at least two transistors connected in parallel between a first node and a low potential source;
   a pull-up transistor connected between the first node and a high potential source; and
   a pull-down transistor connected between the first node and the low potential source.

4. The system of claim 3 wherein one transistor of the at least two transistors is connected to a preceding stage and another transistor of the at least two transistors is connected to a following stage of the control circuit.

5. The system of claim 3 wherein the pull-up transistor is controlled by a request signal from the execution circuit, the pull-down transistor is controlled by a done signal from the execution circuit, and the first node provides a grant signal to the execution circuit.

6. The system as in claim 3 wherein the at least two transistors further comprises a third transistor also connected in parallel.

7. The system of claim 1 wherein the execution circuit comprises a sequence of serially connected execution units, each unit being coupled to a corresponding stage of the control circuit.

8. The system of claim 3 wherein:

the execution circuit comprises a sequence of serially connected execution units having a last execution unit connected to a pair of execution units which are each connected to the last execution unit to form a branch, and wherein one of the at least two transistors is coupled to a stage in the control circuit coupled to the last execution unit, the other of the at least two transistors is connected to a stage in the control circuit coupled to one of the pair of execution units, and the third transistor is connected a stage in the control circuit coupled to the other of the pair of execution units.

9. A method of controlling a system having a series of execution units to prevent adjacent units from operating simultaneously, the method comprising:

providing a series of mutual exclusion elements interconnected to each other in a chain; and coupling each mutual exclusion element to a corresponding execution unit in the series of execution units.

10. A method as in claim 9 wherein each of the execution units comprises a unit in a counterflow pipeline processor.

11. The method of claim 9 wherein the series of execution units includes a branch having at least two legs, a first leg having a first series of execution units, a second leg having a second series of execution units, and wherein there is an execution unit at the branch connected to both the first leg and the second leg, and the method further comprises:

providing a first series of mutual exclusion elements interconnected to each other and coupled to corresponding execution units in the first leg;

providing a second series of mutual exclusion elements interconnected to each other and coupled to corresponding execution units in the second leg;

and providing another mutual exclusion element interconnected to a selected mutual exclusion element in both the first and second series of mutual exclusion elements and coupled to control the execution unit at the branch.

12. A method as in claim 9 wherein:

the series of execution units comprise a series of execution units, all of the n series intersecting at a specific execution unit;

the series of mutual exclusion elements comprise n series of mutual exclusion elements, all of the n series intersecting a specific mutual exclusion element coupled to the specific execution unit; and wherein the n series of execution units and the n series of mutual exclusion elements are symmetrically arranged about the specific execution unit and the specific mutual exclusion element.

13. A circuit comprising:

a first source and a second source of electrical signals;

a sequence of stages coupled to each other, each stage including:

a first output node;

a first input node;

a second input node;

a first transistor having a gate electrode coupled to the first input node; a source electrode coupled to the first output node, and a drain electrode coupled the second source of electrical signals;

a second transistor having a gate electrode coupled to the second input node; a source electrode coupled to the first output node, and a drain electrode coupled the second source of electrical signals;

a third transistor having a source electrode coupled to the first output node, a drain electrode coupled to the second source of electrical signals, and a gate electrode coupled to receive a done signal;

a fourth transistor having a gate electrode coupled to receive a request signal, a drain electrode coupled to the first node, and a source electrode connected to the first source of electrical signals;

wherein the first input node of each stage is coupled to the first output node of the immediately preceding stage, and the second input node is coupled to the first output node of each immediately subsequent stage.

14. A circuit as in claim 13 wherein each of the first, second, and third transistors comprise NMOS transistors.

15. A circuit as in claim 14 wherein the fourth transistor comprises a PMOS transistor.

16. A circuit as in claim 15 wherein the fourth transistor has a channel width-to-length ratio of the third transistor.

17. A circuit as in claim 16 wherein the first source of electrical signals comprises a positive potential source, and the second source of electrical signals comprises a lower potential source.

18. A circuit as in claim 13 further comprising an associated circuit coupled to the sequence of stages to be controlled thereby.

19. A circuit as in claim 18 wherein the associated circuit comprises stages in a counterflow pipeline processor.

20. A circuit as in claim 18 wherein the associated circuit is coupled to receive signals from the first output node and to provide the done signal and to provide the request signal.

* * * * *